United States Patent [19]

Wieske et al.

[11] 3,759,961
[45] Sept. 18, 1973

[54] PROCESS FOR ETHINYLATING 17-KETOSTEROIDS

[75] Inventors: Reinhold Wieske; Paul-Eberhard Schulze, both of Berlin, Germany

[73] Assignee: Sckering Aktiengesellschaft, Berlin/Bergkamen, Germany

[22] Filed: June 3, 1971

[21] Appl. No.: 149,808

[30] Foreign Application Priority Data
June 13, 1970 Germany.................... P 20 30 056.5

[52] U.S. Cl... 260/397.4, 260/239.5, 260/239.55 R, 260/239.55 C, 260/397.5, 260/397.5 A
[51] Int. Cl.......................................... C07c 167/20
[58] Field of Search....................... 260/397.4, 397.5

[56] References Cited
OTHER PUBLICATIONS

J. Amer. Chem. Soc., 78, (1956), article by Reingold et al., pages 2477–2479, relied on.

*Primary Examiner*—Elbert L. Roberts
*Attorney*—Michael S. Striker

[57] ABSTRACT

Process for preparing 17α-ethinyl-17β-hydroxysteroids characterized by the partial formula

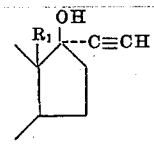

(I)

wherein $R_1$ is lower alkyl by ethinylating 17-ketosteroids characterized by the partial formula

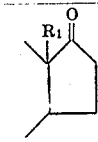

(II)

wherein $R_1$ has the same meaning as above, with acetylene in the presence of an alkali alcoholate of a tertiary alcohol and in the presence of a solvent in the absence of any tertiary alcohol.

6 Claims, No Drawings

PROCESS FOR ETHINYLATING 17-KETOSTEROIDS

This invention relates to a process for ethinylating 17-ketosteroids. More particularly the invention relates to a process for preparing 17α-ethinyl-17β-hydroxysteroids characterized by the partial formula

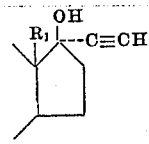

(I)

wherein $R_1$ is lower alkyl, by ethinylating a 17-ketosteroid characterized by the partial formula

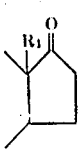

(II)

in which $R_1$ has the same meaning as above with acetylene in the presence of an alkali alcoholate of a tertiary alcohol and of a solvent but in the absence of a tertiary alcohol.

The definition of $R_1$ as lower alkyl in the above formulae is intended to designate alkyl containing one to six carbon atoms. The alkyl groups can be straight or branched chain, saturated or unsaturated. Illustrative examples of lower alkyl $R_1$ include methyl, ethyl, propyl, isopropyl, butyl, isobutyl, secondary butyl, tertiary butyl, pentyl, isopentyl, tertiary pentyl, hexyl and the corresponding unsaturated analogs. Preferably $R_1$ designates methyl, ethyl or propyl.

Instances of suitable starting materials for use in the process of the invention are the 17-ketosteroids of the estrane and androstane series which can be substituted in the conventional manner, for instance by free, esterified or etherified hydroxyl groups in any of the 1-, 3-, 6- or 11- positions; free or functional oxo groups in any of the 3- or 11-positions; methyl groups in any of the 1-, 2- or 6- positions; or methylene groups in any of the 1,2-, 5,10- or 6,7- positions. Furthermore, the 17-ketosteroids can contain an aromatic A- or B- ring or a double bond, for example, in any of the 1-, 2-, 4-, 5(6)-, 5(10)-, 8(9)-, 8(14)- or 9(11)- positions. It is of course to be understood that the starting compounds can have a multiple number of the aforenamed substituents and/or double bonds.

The ethinylation of 17-ketosteroids with acetylene in the presence of alcoholates of tertiary alcohols and of tertiary alcohols is known (DBP 1,013,649; DBP 1,016,707; DAS 1,264,441 and Ringold et al. J.Amer.-Chem.Soc., 78, 1956, 2477-2479).

In accordance with the known procedure, the 17-ketosteroid is dissolved in a suitable solvent reacted with a solution of alkali alcoholate in an excess of the tertiary alcohol and acetylene then conducted into the reaction mixture. The known ethinylation process has the disadvantage that in the ethinylation of 17-ketosteroids whose 13- position angular methyl group is alkyl substituted only very small yields of the desired 17α-ethinyl-17β-hydroxy-steroid are obtained (H.Smith et al. Chem.Soc. (London), 1964, 4472-4492, especially 4475). Accordingly, the process is suitable only for the synthesis of 17α-ethinyl-17β-hydroxysteroids, the 13- position angular methyl group of which is unsubstituted.* (*Since this procedure is easily to be carried out, it is preferably adopted for the large scale manufacture of these steroids, although, for obtaining satisfactory yields, reaction times in access of 15 hours are necessary.)

It is an object of this invention to provide an ethinylation process that is not only suitable for preparing 17α-ethinyl-17β-hydroxysteroids containing an unsubstituted 13 - position methyl group but which is equally suitable for effecting the synthesis of 17α-ethinyl-17β-hydroxysteroids containing an alkyl substituted 13- position methyl group.

Another object is to provide such a process which is technically less expensive to effect than the known ethinylation method.

Still another object of the invention is such a process equally applicable to the synthesis of steroid compounds having an unsubstituted 13- position methyl group as well as to the synthesis of the corresponding substituted compounds.

These and other objects and advantages of the invention will be apparent from a consideration of the following disclosure.

In accordance with the invention, it has now been found that the above objects are attained if the ethinylation of 17-ketosteroids is carried out with acetylene in the presence of an alkali alcoholate of a tertiary alcohol and of a solvent but in the absence of any tertiary alcohol.

As alkali alcoholates for use in the process of the invention, there are suitable alcoholates of tertiary alcohols which have been used heretofore in the known ethinylation reaction, particularly suitable are sodium or the potassium alcoholates such as for instance sodium or potassium tertiary butylate and sodium or potassium tertiary amylate.

As solvent there may be used for the ethinylation process of the invention any of the solvents conventionally used in ethinylating reactions. Examples of such solvents include for instance, aromatic hydrocarbons such as benzene, toluene or xylene, ethers such as diethylether, gylcoldimethylether, dioxan or tetrahydrofuran and polar aprotonic solvent such as dimethylformamide, N-methylacetamide or dimethylsulfoxide.

The process of the invention is preferably carried out at a reaction temperature of less than 60°C and most preferably at a temperature of from +20 to −20°C.

The process of the invention can be carried out at normal pressure and also at elevated pressure and preferably using pressures of up to 5 atmospheres.

The working up of the reaction mixture is carried out using the conventional working techniques, for instance by concentration of the mixtures in vacuum or through precipitation of the reaction products with water or dilute mineral acids. As part of the working up, there can be split off if required from the reaction products, previously present ketal groups, enol groups or enamine groups, if necessary under additional isomerization of existing double bonds. The recovered crude products can be purified in the conventional manner for instance through chromatography and/or crystallization.

The following table shows the superiority of the process of the invention as compared to the known ethinylation method. The reaction involved in the comparison is that of the ethinylation of 3-methoxy-18-methyl-2,5(10)-estradiene-17-one. The experiments were carried out by a. diluting 5.5g potassium tertiary butylate with tetrahydrofuran to 110 ml or b. reacting 5.5g potassium tertiary butylate with tertiary butanol, diluting the resulting mixture with tetrahydrofuran to 110 ml, followed by cooling to −10°C, conducting acetylene into the cooled mixture for 1 hour and then reacting this mixture with 10g of compound to be ethinylated, introducing further acetylene and analyzing the reaction mixture after the reaction time had elapsed.

TABLE 1

Percent transformation of 3-methoxy-18-methyl-2,5(10)-estradiene-17-one with different tertiary butanol contents in the reaction mixture

| Reaction time (hrs.) | ml — tertiary Butanol | |
|---|---|---|
| | 0 ml | 11 ml |
| 1 | 82.3% | 31.0% |
| 2 | 93.3% | 37.8% |
| 3 | 98.8% | |
| 4 | | 48.2% |
| 5 | | 49.3% |

As this table shows in the reaction of 17-ketosteroids having an alkyl substituted 13-methyl group, a considerable reaction acceleration and also a significant increase in yield is realized if the reaction is carried out in the absence of any tertiary alcohol. In the conversion of 17-ketosteroids having an unsubstituted 13-methyl group, the reaction velocity is increased even further, i.e., a more than 5-fold increase is observed when the ethinylation is carried out in the absence of the tertiary alcohol.

TABLE 2

Percent transformation of 3-methoxy-2,5(10)-estradiene-17-one with different tertiary butanol contents in the reaction mixture. Reaction conditions: 10 g steroid, 11 g potassium tertiary butylate in 110 ml solvent (a) tetrahydrofuran (b) tetrahydrofuran + tertiary butanol; procedure analogous to Table 1.

| Reaction times (hrs.) | ml—tertiary butanol | |
|---|---|---|
| | 0 ml | 35 ml |
| 0.5 | 91.0 % | |
| 1 | 96.3 % | 36.3 % |
| 1.5 | 98.0 % | |
| 8 | 98.0 % | 76.5 % |
| 16 | | 95.1 % |

There are prepared using the process of the invention, pharmacologically active 17α-ethinyl-17β-hydroxysteroids for instance gestation active steroids, i.e., fertility regulating steroids such as 17α-ethinyl-19-nor-testosterone or 17-α-ethinyl-18-methyl-19-nor-testosterone or estrogenic activ steroids such as 3-methoxy-18-methyl-17α-ethinyl-1,3,5 (10)-estratrien-17β-ol and 3-methoxy-17α-ethinyl-1,3,5 (10)-estratrien-17β-ol (mestranol). The latter aromatic compounds also could be intermediate products for preparing of 17α-ethinyl-19-nor-testosterone by methods known in the art. Further the products prepared by the process of the invention are valuable intermediate products for use in the synthesis of pharmacologically active pregnane derivatives such as 17α-hydroxy-progesterone-caproate, hydrocortisone or prednisolone because it is possible to convert the 17α-ethinyl-side chain in the progesterone or hydrocortine side chain as predescribed, e.g., by Ruczicka, Helv. chem. Act. 22 (1939) 416, Miescher, Helv. chem. Act. 22 (1939) 120 and 33 (1950) 1840, Inhoffen, Ber. 71 (1938) 1032, Hershberg, J. Am. Soc. 73 (1951) 5074, Schoppee, Helv. chem. Act. 26 (1943) 1004.

Instances of suitable starting compounds for use in the process of the invention are the 17-ketosteroids which can be converted into 17α-ethinyl-17β-hydroxysteroids which are per se pharmacologically active or which constitute important intermediate products for use in the synthesis of pregnane derivatives. Preferred examples of starting compounds for the process of the invention are 17-ketosteroids having the formula:

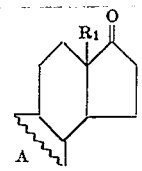

(III)

wherein $R_1$ is lower alkyl and A is one of the groups

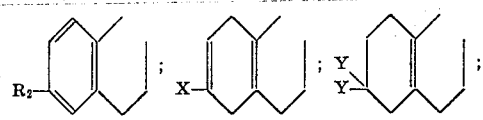

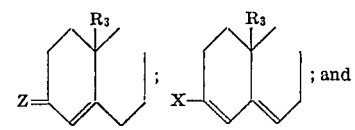

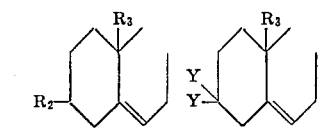

in which $R_2$ is hydroxy, lower alkoxy or lower acyloxy, $R_3$ is hydrogen or lower alkyl, preferably methyl, X is hydrogen, lower alkoxy, lower acyloxy, morpholino, piperidino or pyrrolidino, Y can be hydrogen or the both Ys together a free or protected keto group and Z is either 2 hydrogen atoms or a keto group.

In accordance with a further aspect of the invention there are made possible in accordance with the invention new pharmacologically available compounds not heretofore available including 18-methyl-17α-ethinyl-5-androstene-3β-17β-diol and 3β-hydroxy-18-methyl-5-androstene-17-one.

The following Examples are given in order to more fully illustrate the invention and are in nowise to be construed as in any way limiting the scope thereof.

EXAMPLE 1

Acetylene was introduced under stirring and over an hour period into a mixture cooled to −10°C consisting of 11g potassium tertiary butylate and 200 ml tetrahydrofuran. 20g Racemic 3-methoxy-18-methyl-2,5(10)-estradiene-17-one were then introduced into the mixture and under stirring and at −10°C further acetylene introduced therein over a 3-hour period. After the reaction had ended, the reaction mixture was decomposed by addition thereto of 100 ml methanol and 18.5 ml concentrated hydrochloric acid, the solvent distilled off in vacuum at 45°–55°C and replaced during the distillation with 320 ml water. The mixture was then stirred under ice cooling, the separated product suctioned off, washed with water until neutral, dried in vacuum and crystallized out of acetone.

There were thusly recovered 17.6 g 17β-hydroxy-18-methyl-17α-ethinyl-4-estrene-3-one (85 percent of theory) having a melting point of 207°–209°C.

EXAMPLE 2

Acetylene was introduced under stirring for 1-hour period into a mixture cooled to 15°C consisting of 5.5g potassium tertiary butylate and 52.5 ml tetrahydrofuran. 10g 3-methoxy-2,5(10)-estradiene-17-one were then introduced into the mixture and acetylene conducted therein for a further 90 minutes under stirring at 15°C. After working up the reaction mixture as described in Example 1 and crystallizing the crude product out of methylenechloride, there were recovered 8.6g 17β-hydroxy-17α-ethinyl-4-estrene-3-one (82.5 percent of theory) having a melting point of 206°–207.5°C.

$[\alpha]_D^{20} = -24.1°$ (Chloroform; c=1 percent)

EXAMPLE 3

Acetylene was introduced for one hour at −15°C into a suspension consisting of 5.3g potassium tertiary butylate in 110 ml tetrahydrofuran. 10g 3-methoxy-18-ethyl-2,5(10)-estradiene-17-one were then introduced and further acetylene conducted into the resulting mixture for 3 hours. The reaction mixture was worked up as described in Example 1. The crude product was crystallized out of cyclohexane-diisopropylether and yielded 8.35g 17β-hydroxy-18-ethyl-17α-ethinyl-4-estrene-3-one (80.5 percent of theory) having a melting point of 182°–184°C.

$[\alpha]_D^{20} = -26.3°$ (Chloroform).

EXAMPLE 4

Acetylene was introduced at −5°C for 1 hour into a suspension consisting of 5.5 g potassium tertiary butylate in 100 ml tetrahydrofuran. 10 g 3-Methoxy-18-methyl-1,3,5(10)-estratriene-17-one were then added and further acetylene introduced at −5°C for an additional 3 hours, the reaction mixture decomposed by addition thereto of 27 ml 20 percent sulfuric acid and 14 ml water, and the tetrahydrofuran distilled off in vacuum and replaced by water. The material which thereupon separated out was extracted with methylene chloride, the methylenechloride phase washed until neutral and evaporated to dryness. The residue was crystallized out of methylenechloride and yielded 8.41 g 3-methoxy-18-methyl-17α-ethinyl-1,3,5(10)-estratriene-17β-ol (77 percent of theory) having a melting point of 98° – 99°C.

$[\alpha]_D^{20} = -17.8°$ (Chloroform).

EXAMPLE 5

Under the reaction conditions described in Example 4, 10 g racemic 3-methoxy-18-ethyl-1,3,5(10)-estratriene-17-one were ethinylated. After working up the reaction mixture as described in Example 4 and crystallizing the crude product out of ethylacetate, there were recovered 8.24 g 3-methoxy-18-ethyl-17α-ethinyl-1,3,5(10)-estratriene-17β-ol (76 percent of theory) having a melting point of 128° – 130°C.

EXAMPLE 6

Acetylene was conducted for 1 hour at −10°C into a suspension of 6.0 g potassium tertiary butylate in 100 ml tetrahydrofuran and then 10 g 3-methoxy-1,3,5(10)-estratriene-17-one were introduced. Thereafter there was conducted into the mixture under stirring for a further 2 hours additional acetylene at −10°C. The reaction mixture was further worked up as described in Example 4 and the resultant crude product crystallized out of ethylacetate. There were recovered 9.68 g 3-methoxy-17α-ethinyl-1,3,5(10)-estratriene-17β-ol (89 percent of theory) having a melting point of 151° – 152.5°C.

$[\alpha]_D^{20} = +4.5°$ (Dioxan).

EXAMPLE 7

20 g 3-Hydroxy-1,3,5(10)-estratriene-17-one were introduced into a suspension of 25.2 g potassium tertiary butylate in 400 ml tetrahydrofuran into which acetylene had been introduced for 1 hour at 15°C. Further acetylene was then conducted into this mixture under stirring for an additional 3 hours at 15°C and the reaction mixture worked up as set out in Example 4. The crude product was crystallized out of acetone and there were recovered 18.7 g 17α-ethinyl-1,3,5(10)-estratriene-3,17β-diol (85 percent of theory) having a melting point of 182.5° – 183.5°C.

$[\alpha]_D^{20} = +2.6°$ (Dioxan).

EXAMPLE 8

5 g 4-Estrene-3,17-dione were introduced into a suspension of 5.5 g potassium tertiary butylate and 55 ml tetrahydrofuran into which acetylene had previously been introduced for 1 hour at −10°C. There was then introduced into the resulting mixture for another 2 hours, under stirring at −10°C, additional acetylene, the reaction mixture worked up as described in Example 4 and the crude product crystallized out of methylene chloride. There were thusly obtained 4.4 g 17β-hydroxy-17α-ethinyl-4-estrene-3-one (80.4 percent of theory) having a melting point of 205° – 206°C.

$[\alpha]_D^{20} = -23.8°$ (Chloroform).

EXAMPLE 9

10 g 18-Methyl-4-estrene-3,17-dione were ethinylated analogously to Example 8 in the presence of 11 g potassium tertiary butylate in 110 ml tetrahydrofuran by introducing acetylene for 2 hours at −10°C. After working up the reaction mixture as described in Example 4 and crystallizing the crude product out of methylenechloride there were recovered 8.28 g 17β-hydroxy-18-methyl-7α-ethinyl-4-estrene-3-one (76 percent of theory) having a melting point of 235° – 237°C.

$[\alpha]_D^{20} = -32.8°$ (Chloroform).

EXAMPLE 10

5 g 3β-Hydroxy-5-androstene-17-one were introduced into a suspension of 2.75 g potassium tertiary butylate in 5 ml tetrahydrofuran into which acetylene has previously been introduced for 1 hour under stirring at 15°C. Additional acetylene was then introduced into the mixture for a further 2 hours at 15°C. The reaction mixture was thereafter worked up as described in Example 4, the crude product crystallized out of methylenechloride and there were recovered 5.15 g 17α-ethinyl-5-androstene-3β,17β-diol (94percent of theory) having a melting point of 234° – 238°C.

$[\alpha]_D^{20} = -127°$ (Dioxan).

EXAMPLE 11 a. 17β-Acetoxy-18-methyl-5(10)-estrene-3-one (melting point 145° – 146°C) was hydrogenated with Raney nickel to 17β-acetoxy-18-methyl-5(10)-estrene-3β-ol (melting point 100° – 101.5°C) and converted with methyleneiodide in the presence of zinc-copper into 17β-acetoxy-18-methyl-5,10β-methylene-5β-estrane-3β-ol (melting point 127.5° – 128°C). After oxidation with chromic acid to form the corresponding 3-ketone (melting point 140° – 141.5°C), the 5,10β-methylene ring was split with acid and there were recovered 17β-acetoxy-18-methyl-4-androstene-3-one (melting point 113° – 114°C). In order to form the ketal, the 3-keto group was treated with ethyleneglycol in the presence of p-toluene sulfonic acid under splitting off of water. The recovered 3,3-ethylenedioxy-17β-acetoxy-18-methyl-5-androstene (melting point 200.5° – 203°C) was saponified with potassium carbonate in water and methanol to form the 17β-hydroxy compound (melting point 161.5° – 163°C) which was oxidized with CrO₃/pyridine at room temperature to 3,3-ethylenedioxy-18-methyl-5-androstene-17-one (melting point 194.5° – 198°C). The 3,3-ethylenedioxy-18-methyl-5-androstene-17-one was treated with acetic acid under heating in order to split the ketal. The thereby recovered 18-methyl-4-androstene-3,17-dione (melting point 141° – 142°C) was isomerized with potassium tertiary butylate in tertiary butanol at low temperatures and then reduced with lithiumaluminum-tritertiary butoxyhydride to 3β-hydroxy-18-methyl-5-androstene-17-one (melting point 166° – 168°C).

b. 4g 3β-Hydroxy-18-methyl-5-androstene-17-one were introduced into a suspension of 2.15 g potassium tertiary butylate and 44 ml tetrahydrofuran into which previously, for 1 hour under stirring at −15°C, acetylene had been introduced. Further acetylene was then introduced under stirring into this mixture for 2 hours at −15°C, the reaction mixture worked up as described in Example 4 and the crude product crystallized out of methylenechloride. There were recovered 3.9 g 18-methyl-17α-ethinyl-5-androstene-3β,17β-diol (90 percent of theory) having a melting point of 220° – 222°C. (Oxidation of 3β-hydroxyl results the known 18-methyl-17α-ethinyl-testosterone).

EXAMPLE 12

Acetylene was pressed into a rolling autoclave containing 20 ml tetrahydrofuran and 1 g potassium tertiary butylate under 2 atmospheres of an over pressure of nitrogen. After an hour, the autoclave was cooled down to −10°C, the contents allowed to expand, 500 mg of racemic 18-methyl-4-estrene-3,17-dione added, the autoclave sealed and nitrogen and acetylene again introduced. After an hour of reaction time and the mixture was worked up as described in Example 8. There were recovered 400 mg 17β-hydroxy-18-methyl-17α-ethinyl-4-estrene-3-one (70 percent of theory) having a melting point of 208° – 211°C.

EXAMPLE 13 a. 6 g 18-Methyl-4-androstene-3,17-dione were dissolved in 60 ml methanol, the solution reacted with 3.5 ml pyrrolidine and allowed to stand at room temperature. The separated out 3-pyrrolidino-18-methyl-3,5-androstadiene-17-one was suctioned off, washed and dried in vacuum (yield 6.3 g).

b. 6.3 g 3-Pyrrolidino-18-methyl-3,5-androstadiene-17-one were introduced into a suspension, cooled to −10°C of 6.6 g potassium tertiary butylate in 120 ml tetrahydrofuran into which acetylene had previously been introduced for 1 hour. Acetylene was then introduced into the resulting mixture at −10°C for an additional 3 hours. The reaction mixture was poured into water, the tetrahydrofuran taken off in vacuum and the aqueous phase extracted with methylenechloride. By concentrating the methylenechloride phase and crystallizing the crude product out of acetone, there were recovered 3.8 g 17β-hydroxy-18-methyl-17α-ethinyl-4-androstene-3-one having a melting point of 233° – 236°C.

$[\alpha]_D^{20} = +13.8°$ (Chloroform).

EXAMPLE 14

10 g 3-Methoxy-2,5(10)-estradiene-17-one were ethinylated over a 90 minute period at 15°C as described in Example 2. The reaction mixture was decomposed with water, the tetrahydrofuran distilled off in vacuum and the separated crude product filtered off. The crude product was crystallized out of methanol-methylenechloride under addition of pyridine and there were recovered 8.72 g 3-methoxy-17α-ethinyl-2,5(10)-estradiene-17β-ol (80 percent of theory) having a melting point of 192° – 194°C.

$[\alpha]_D^{20} = +65.2°$ (Chloroform).

EXAMPLE 15

Acetylene was introduced into a suspension of 5.5 g potassium tertiary butylate and 60 ml tetrahydrofuran cooled to −10°C under stirring for 1 hour. 10 g 3,3-Dimethoxy-5(10)-estrene-17-one were then added and additional acetylene introduced for a further hour at 10°C. The reaction mixture was worked up as described in Example 1 and the recovered crude product crystallized out of methylenechloride. There were recovered 7.71 g 17β-hydroxy-17α-ethinyl-4-estrene-3-one (82 percent of theory) having a melting point of 206° – 207°C.

$[\alpha]_D^{20} = 23.5°$ (Chloroform).

EXAMPLE 16

Under the conditions described in Example 4, 8g d-18-methyl-4-estrene-17-one were ethinylated. The reaction mixture was worked up as described in Example 4 and 6,1 g d-18-methyl-17α-ethinyl-4-estrene-17β-ol were obtained in the form of an oil. NMR: 5.38 ppm, 2.55 ppm, 0.98 ppm, IR 3608, 3300, 2925, 2870, 2830, 1045.

EXAMPLE 17

Using 20 g (d-) 3-methoxy-18-methyl-2,5(10)-estradiene-17-one as starting material and under the conditions of Example 1 but with the tetrahydrofuran replaced by dimethylformamide, there were recovered after working up the reaction mixture as described in Example 1 and crystallizing out of methylenechloride 15.6 g 17β-hydroxy-18-methyl-17α-ethinyl-4-estrene-3-one (75 percent of theory) having a melting point of 234° – 237°C.

$[\alpha]_D^{20} = 33.1°$ (Chloroform).

EXAMPLE 18

Acetylene was introduced for 1 hour at 15°C into a suspension consisting of 4,4 g Sodium tertiary amylate in 100 ml benzene-diethyl ether (1:1). 7,3 g 3,3 Dimethoxy-5(10)-estrene-17-one were then introduced and further acetylene conducted into the resulting mixture for one hour at 15°C. After the reaction had ended the reaction mixture was decomposed by addition of dilute solution of ammonium chloride. The organic solution had been washed with water and after drying the organic solvent was destilled off. The residue was dissolved in 200 ml acetone and mixed with 12 ml concentrated hydrochloric acid. After one hour at room temperature the reaction mixture was stirred into ice water, the separate product suctioned off, washed with water until neutral, dryed and crystallized out of methylenechloride. There were thus by obtained 5,38 g 17β-hydroxy-17α-ethinyl-4-estrene-3-one having a melting point of 205°–206,5°C, $[\alpha]_D^{20} = -24,0°$ (Chloroform; c = 1 percent).

What is claimed is:

1. The process of making 17α-ethinyl-17β-hydroxy steroids, the said process comprising ethinylating a steroid of the formula

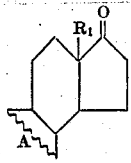

wherein $R_1$ is lower alkyl of one to three carbon atoms and A is one of the following:

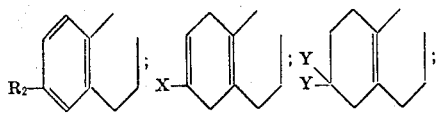

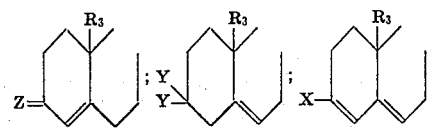

and

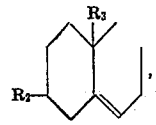

$R_2$ being hydroxy, lower alkoxy or lower acyloxy, $R_3$ being hydrogen or methyl, X being hydrogen, lower alkoxy, lower acyloxy, morpholinol, piperidinol or pyrrolidinol, Y being hydrogen or both Y together constituting an hydroxy acetal or ketal protected keto group and Z being two hydrogen atoms or a keto group with acetylene in the presence of an alkali alcoholate of a tertiary alcohol in a solvent in the absence of any free tertiary alcohol.

2. Process according to claim 1 wherein $R_3$ is methyl.

3. Process according to claim 1 wherein said alkali alcoholate is potassium tertiary butylate.

4. Process according to claim 1 wherein said solvent is a cyclic ether.

5. Process according to claim 4 wherein said solvent is tetrahydrofuran.

6. Process according to claim 1 which comprises conducting said ethinylation at a temperature of from +20° to −20°C.

* * * * *